United States Patent Office 3,062,631
Patented Nov. 6, 1962

3,062,631
INHIBITING CORROSION
Ralph B. Thompson, Hinsdale, Ill., assignor, by mesne assignments, to Universal Oil Products Company, Des Plaines, Ill., a corporation of Delaware
No Drawing. Filed Dec. 5, 1958, Ser. No. 778,320
11 Claims. (Cl. 44—71)

This invention relates to a novel method of inhibiting corrosion of metal surfaces by water associated in relatively small quantities with organic materials.

In the handling of various organic materials, particularly hydrocarbons and similar organic liquid compositions, it is often necessary to transport and/or store such materials in metal containers, as in steel, iron or other metal pipe lines, drums, tanks and the like. Since these materials often contain varying amounts of water in solution or in suspension which may separate, due to temperature changes, internal corrosion of the container by separating water almost invariably occurs to a greater or lesser degree. This problem is especially serious when handling gasoline, kerosene, fuel oil, crude oil, etc. In spite of all reasonable and practical precautions during the manufacture of the hydrocarbon distillate, water is found as a film or in minute droplets in the pipe line or in container walls or even in small pools in the bottom of the container. This brings about ideal conditions for corrosion and consequent damage to the metal surfaces of the container, as well as the even more serious contamination of the hydrocarbon oil or other materials contained therein by the corrosion products.

Corrosion problems also occur, for example, in the lubrication of internal combustion engines or steam engines including turbines and other similar machinery, in which quantities of water are often observed as a separate phase within the lubricating system as a result of the condensation of water from the atmosphere or, in the case of internal combustion engines, as a result of dispersion or absorption in lubricating oil of water formed as a product of fuel combustion. Water in such instances, corrodes the various metal parts of the machinery with which it comes in contact, the corrosion products causing further mechanical damage to bearing surfaces and the like due to their abrasive nature and catalytically promoting the chemical degradation of the lubricant. Corrosion problems are encountered with other oils including cutting oils, soluble oils, rolling oils, the latter comprising oils used in the rolling of metals, which oils also may be used in other forming operations such as stamping, cutting, casting, etc. These oils may be of mineral, animal or vegetable origin. Corrosion problems also arise in the preparation, transportation and use of alcohols, ketones, etc., and in various coating compositions such as greases, both of synthetic and petroleum origin, waxes, household oils, paints, lacquers, etc., which often are applied to metal surfaces for protective purposes.

A particular application of the corrosion inhibitor of the present invention is in greases used for special applications. For example, corrosion problems are serious in cases of greases used in instruments, aircrafts, watches, etc. It is apparent that, in these delicate and important applications, it is essential to prevent corrosion. The greases may be of animal, vegetable or mineral origin or may be synthetically prepared.

In one embodiment the present invention relates to a method of retarding corrosion of a metal surface upon contact with an organic substance and water, which comprises effecting said contact in the presence of a corrosion inhibitor prepared by condensing a beta-lactone and an amine and further reacting at a temperature of from about 100° to about 2000° C.

In a specific embodiment, the present invention relates to a method of retarding corrosion of a metal surface upon contact with a hydrocarbon distillate and water, which comprises incorporating in said hydrocarbon distillate a corrosion inhibitor prepared by condensing beta-propiolactone and N-tallow-1,3-diaminopropane and further reacting the condensation product at a temperature of from about 130° to about 180° C.

In another embodiment, the present invention relates to an organic material coming in contact with water, said organic material containing a corrosion inhibitor herein set forth.

In the preparation of the corrosion inhibitor of the present invention, a beta-lactone is condensed with an amine. Any suitable beta-lactone may be used. Beta-propiolactone generally is preferred because of its ready availability and lower cost. However, other beta-lactones may be used. Illustrative saturated aliphatic beta-lactones include beta-butyrolactone, beta-valerolactone, beta-isovalerolactone, alpha-methyl-beta-propiolactone, alpha-ethyl-beta-propiolactone, beta-isopropyl beta-propiolactone, beta-methyl beta-valerolactone, etc. While it is preferred to utilize the saturated aliphatic beta-lactones and more particularly these lactones containing a total of 3 to 6 carbon atoms, in some cases, unsaturated lactones or lactones containing a cyclic configuration may be employed as, for example, the lactone of o-(hydroxymethyl)-phenyl-acetic acid. In some cases a mixture of beta-lactones may be employed. It is understood that the various lactones which may be utilized are not necessarily equivalent and that the particular beta-lactone to be used will be selected with regard to the availability, cost, amine used in the condensation, the specific substrate in which the final product is to be employed as a corrosion inhibitor, etc.

Any suitable amine may be used in the preparation of the condensation product. The amine preferably contains at least 8 carbon atoms and still more preferably at least 12 carbon atoms. Usually the amine will contain from 8 and preferably from about 12 to about 30 carbon atoms in one embodiment or up to about 70 carbon atoms in another embodiment. It is understood that the amine will be selected with regard to the particular beta-lactone to be used in the condensation so that the condensation product will contain at least 11 and preferably at least 15 carbon atoms. The amine may be a primary, secondary or tertiary amine. Illustrative primary amines include amyl amine, hexyl amine, heptyl amine, octyl amine, nonyl amine, decyl amine, undecyl amine, dodecyl amine, tridecyl amine, tetradecyl amine, pentadecyl amine, hexadecyl amine, heptadecyl amine, octadecyl amine, nonadecyl amine, eicosyl amine, etc. A number of amines are available commercially, generally as a mixture, and these amines advantageously may be used in preparing the condensation product of the present invention. Illustrative examples of such amines include coconut amine, soy bean amine, tallow amine, stearyl amine, etc., and generally contain from about 8 to about 18 carbon atoms per molecule, while other amines are available containing a higher number of carbon atoms per molecule.

It is understood that polyamines and particularly diamines or triamines containing two primary amino groups may be used in preparing the condensation product. The polyamines preferably contain at least 8 carbon atoms. Illustrative examples of such amines include octamethylene diamine, nonamethylene diamine, decamethylene diamine, undecamethylene diamine, dodecamethylene diamine, etc.

A particularly preferred amine containing a secondary amino group is N-tallow-1,3-diaminopropane. This substituted amine is available commercially under the trade name of "Duomeen T" or "Diam 26" and contains from about 12 to 20 carbon atoms per alkyl group and mostly 16 to 18 carbon atoms. Other substituted N-alkyl diaminopropanes comprise those in which the alkyl group is derived from lauric acid, coconut, soya, etc. Other secondary amines include dipropyl amine, dibutyl amine, diamyl amine, dihexyl amine, diheptyl amine, dioctyl amine, dinonyl amine, didecyl amine, diundecyl amine, didodecyl amine, etc.

A number of tertiary amines are available commercially and are advantageously used in preparing the condensation product. One such amine is stearyl dimethyl amine. Other tertiary amines include tripropyl amine, tributyl amine, triamyl amine, trihexyl amine, triheptyl amine, trioctyl amine, trinonyl amine, tridecyl amine, etc., as well as tertiary amines in which all of the tertiary alkyl groups are not the same chain lengths.

In another embodiment the amine used for condensation with the beta-lactone may be prepared by the condensation of an amine with another compound as, for example, by first condensing Duomeen T with formaldehyde and then further condensing this condensation product with beta-propiolactone. In this embodiment the Duomeen T and formaldehyde preferably are condensed in equal molar proportions at a temperature of from ambient to about 100° C., although different proportions and temperatures may be used in some cases.

In another example, Duomeen T and ethylene diamine are condensed with epichlorohydrin and then the product is condensed with beta-propiolactone. In this embodiment a total of 1 or 2 mols of the amine preferably are reacted with 1 mol of epichlorohydrin and generally at a temperature of from ambient to about 100° C. although, in some cases, different proportions and temperatures may be employed.

In still another example tallow amine and tetraethylene pentamine are condensed with epichlorohydrin and then the product is condensed with beta-propiolactone. In this embodiment a total of 1 or 2 mols of the amine preferably are reacted with 1 mol of epichlorohydrin and generally at a temperature of from ambient to about 100° C. although in some cases different proportions and temperatures may be employed.

In some cases the amine may be selected from aryl-substituted aliphatic amines as, for example, benzyl amine, phenyl ethyl amine, para xylyl amine, etc., from aromatic amine as, for example, aniline, toluidine, xylidine, naphthylamine, etc., heterocyclic amines as, for example, pyridyl amines, quinolyl amines, etc., and amines containing oxygen as, for example, furfuryl amine, morpholine, beta-ethoxy ethyl amine, pentanol amine, hexanol amine, heptanol amine, octanol amine, etc., tris-(hydroxymethyl) aminomethane, polyethanol amines, etc. In still other cases, the amine may contain sulfur or halogen as, for example, in compounds as chloroamyl amine, chlorohexyl amine, chloroheptyl amine, chlorooctyl amine, etc., polychloro amines, aminoethyl sulfide beta, beta'-diamino butyl sulfide, mercaptoamyl amine, mercaptohexyl amine, mercaptooctyl amine, etc., cistene, astine, taurine, etc.

The condensation and further reaction may be effected in any suitable manner. In a preferred embodiment the beta-lactone is added gradually to a stirred solution of the amine and the temperature is maintained within the range of from about 10° to about 100° C. and preferably from about 50° to about 80° C. This reaction is exothermic and, in this embodiment of the invention, it may be necessary to cool the reaction mixture to maintain the desired temperature. The time of reaction will run from about 0.5 to 5 hours or more. The reaction mixture then is heated to a temperature of from about 100° to about 200° C. and preferably of from about 130° to about 180° C. for a period of from about 0.5 to about 10 hours and preferably from about 1.5 to about 4 hours in order to obtain the desired further reaction. In another embodiment of the invention, the condensation is effected at the higher temperature of from about 100° to about 200° C. and preferably of from about 120° to about 180° C. for a time of from about 0.5 to about 5 hours, and the mixture is further reacted by being maintained, with stirring, at this temperature for an additional 0.5 to 10 hours or more and preferably from about 1.5 to about 4 hours. It is understood that higher temperatures may be employed when utilizing superatmospheric pressures to maintain the reactants in liquid phase and that longer times up to 10 hours or more may be used.

The reaction is readily effected in the absence of a solvent. However, when desired, a suitable solvent may be employed and should be one which will not react with the amine or beta-lactone. Inert solvents include hydrocarbons and particularly aromatic hydrocarbons including benzene, toluene, xylene, ethylbenzene, cumene, naphtha, etc. While benzene is satisfactory for use as a solvent in effecting the condensation reaction, preferably xylene or a higher boiling aromatic hydrocarbon is used as the solvent in the further reaction of the condensation product. Accordingly, when the condensation and further reaction are both effected at the higher temperature, xylene or a higher boiling aromatic compound preferably is utilized as the solvent. It is understood that the condensation and subsequent further reaction may be effected in the same or different reaction zones.

The condensation of beta-lactone and amine preferably is effected using equal mol proportions of beta-lactone and amine. However, when a polyamine is used in the condensation, the lactone may be used in a concentration up to a maximum of 1 mol proportion of lactone per mol proportion of nitrogens in the amine. In general, however, it is preferred to utilize equal mol proportions of beta-lactone and amine.

Following the initial reaction, the condensation product is further heated in the manner hereinbefore set forth. This results in the formation of esters, amides, etc. and mixtures thereof from the amino, hydroxy and carboxyl groups available in the initial condensation product. This additional heating results in the evolution of water. The further heating, accordingly, is preferably continued until the evolution of water is terminated. However, in some cases, it is satisfactory to discontinue the heating and reaction short of complete evolution of water.

The reaction product generally is recovered as a viscous liquid and may be marketed or used as such or utilized as a solution in a solvent. Conveniently, the solvent will comprise the same solvent employed in preparing the final product and is recovered in admixture with at least a portion of the solvent, thereby avoiding the necessity of recovering all of the solvent and subsequently adding it back. When a more dilute solution is desired than is recovered in the manner hereinbefore set forth, it is understood that the same or different solvent may be commingled with the mixture to form a solution of the desired concentration.

The concentration of the additive to be used as corrosion inhibitor will depend upon the particular substrate in which it is to be used. The corrosion inhibitor will be used in a concentration of from about 0.0001% to about 10% by weight or more and usually will be used in a concentration of from about 0.001% to about 1% by weight of the substrate. The inhibitor may be used along with other additives which are incorporated in the substrate for specific purposes including, for example, antioxidant, metal deactivator, synergist, dye, fuel improver, etc.

The corrosion inhibitor may be incorporated in the substrate in any suitable manner. As hereinbefore set forth, the additive conveniently is marketed as a solution in a suitable solvent, including hydrocarbons and particularly aromatic hydrocarbons as, benzene, toluene, xylene, cumene, naphtha, etc., or alcohols, ketones, etc.

When the inhibitor is to be incorporated in a liquid substrate, it may be added thereto in the desired amount and the resultant mixture suitably agitated in order to obtain intimate admixing of the inhibitor in the substrate. When the inhibitor is to be incorporated in a normally solid substrate, the substrate may be heated to form a liquid composition and the inhibitor added thereto or the inhibitor may be incorporated in the solid substrate in any other suitable manner.

While the additive of the present invention is particularly suitable for use in preventing corrosion, it also will have applicability as an inhibitor to stabilize organic compounds and particularly hydrocarbon distillates, including gasoline, naphtha, kerosene, diesel fuel, burner oil, range oil, fuel oil, residual oil, lubricating oil, marine oil, greases, the latter being of animal, vegetable or mineral origin or synthetically prepared. The additive serves to prevent sediment formation in the oil, retards discoloration thereof and serves to prevent other deterioration due to oxidative reactions.

The following examples are introduced to illustrate further the novelty and utility of the present invention but not with the intention of unduly limiting the same.

EXAMPLE I

The inhibitor of this example was prepared by first condensing equal molar proportions of a mixed amine and then further reacting the condensation product. The mixed amine is marketed under the name of "Alamine 26–D" by General Mills, Inc. and contains 30% hexadecyl amine, 25% octadecyl amine and 45% octadecenyl amine. The condensation was effected by placing 101.69 grams (0.3938 mols) of Alamine 26–D and 75 cc. of benzene as solvent in a reaction zone, and gradually adding thereto 28.49 grams (0.3938 mol) of beta-propiolactone. The mixture was stirred and reacted for one hour. The reaction is exothermic and the reactor was cooled to maintain the temperature at 60–65° C. The product then was distilled to evaporate the benzene. A portion of the condensation product prepared in the above manner and xylene in a concentration sufficient to permit a refluxing temperature of 140° C. were refluxed for about 2.5 hours. The further reacted product was distilled under vacuum at 100° C. to remove the xylene solvent and to recover the final product as a pasty solid. The product has a softening point of 42–45° C.

EXAMPLE II

The additive prepared according to Example I was evaluated in an apparatus designed to simulate plant usage. In this apparatus, a highly polished steel strip is suspended in a neck of a flask containing 300 cc. of a hexane fraction and 25 cc. of water, to which ammonium chloride and hydrochloric acid are incorporated to give a pH of about 1.65. The flask is heated to a temperature of about 100° C. and hydrogen sulfide is continuously passed over the steel strip for 10 hours. At the end of this time, the steel strip is removed for visual observation and determination of the weight lost.

The following table reports the results of a control sample (not containing an additive) of the hexane fraction and another run in which 0.05% by weight of the additive is incorporated in the hexane fraction.

Table I

| Additive | Weight of test strip | | |
|---|---|---|---|
| | Initial, Grams | Final, Grams | Loss, Mg. |
| None | 9.4443 | 9.4013 | 43.0 |
| Example I | 8.8455 | 8.8412 | 4.3 |

From the data in the above table, it will be seen that the additive was very effective in reducing corrosion.

EXAMPLE III

Another additive was prepared in substantially the same manner as described in Example I except that a different mixed amine was utilized in the original condensation. This mixed amine is a tallow amine and is similar to the mixed amine used in Example I. The final product was recovered as a tan paste having a softening point of 42–45° C.

The additive prepared in the above manner was evaluated as a corrosion inhibitor in a humidity cabinet test. In this test, a highly polished steel panel is dipped into a viscous naphthenic mineral oil, excess oil is drained, and the panel is placed in a humidity cabinet maintained at 120° F. in an atmosphere saturated with water. The panels are slowly rotated, and the time required for visible corrosion to appear on the panel is reported. A panel dipped in a control sample of the oil (not containing an inhibitor) undergoes visible corrosion in 2 to 3 hours.

One percent by weight of this additive was incorporated in another sample of the oil. The steel panel dipped in this oil and then placed in the humidity cabinet did not undergo visible corrosion until after 6 days of exposure at 120° F. to the atmosphere saturated with water. Thus, it will be seen that the additive served to extend the time of visible corrosion from 2–3 hours to six days.

EXAMPLE IV

The corrision inhibitor of this example is prepared by the condensation of equal mol proportions of Duomeen T and beta-propiolactone, followed by heating and further reaction. It will be noted that Duomeen T is N-tallow-1,3-diaminopropane and predominates in alkyl groups of 16 to 18 carbon atoms each. The condensation is effected by gradually adding beta-propiolactone to the stirred and heated Duomeen T and the temperature is maintained at 60° C. The reaction mixture then is heated and reacted at a temperature of 150° C. for 2 hours.

The additive prepared in the above manner is utilized as an inhibitor in grease and particularly for use in aircraft and instruments at both low and high temperatures. The grease will effectively lubricate at tempeartures as low as —65° F. and as high as 250° F. and for short periods as high as 300° F. The corrosion properties are determined, as described in specifications MIL-G-3278A, by rotating an assembled bearing for one minute at 1750 r.p.m., while holding the grease cup stationary. The entire assembly is dipped into freshly boiled distilled water which has been cooled to room temperature. The assembly is placed in a glass jar to which 5 ml. of distilled water had been added, and stored in this manner for 14 days at 77°±1° F. At the end of the test period, the bearings are removed, cleaned and rated for corrosion effects. When evaluated in the above manner, the grease containing 1% by weight of the inhibitor prepared as described above considerably reduces corrosion of the metal parts.

I claim as my invention:

1. A method of retarding corrosion of a metal surface upon contact with water, which comprises effecting said contact in the presence of a corrosion inhibiting concentration of a corrosion inhibitor prepared by first condensing equimolar proportions of a beta-lactone containing from about 3 to about 6 carbon atoms per molecule and a polyamine containing from about 8 to about 70 carbon atoms per molecule at a temperature of from about 10° C. to about 200° C. for about 0.5 to about 5 hours and thereafter maintaining the condensation product at a temperature of from about 100° to about 200° C. for about 0.5 to about 10 hours.

2. A method of retarding corrosion of a metal surface upon contact with water, which comprises effecting said contact in the presence of a corrosion inhibiting concentration of a corrosion inhibitor prepared by first condensing, at a temperature of from about 10° to about 100° C. and for a reaction period of from about 0.5 to about 5 hours, equimolar proportions of a beta-lactone containing from about 3 to about 6 carbon atoms per molecule and a polyamine containing from about 8 to about 70 carbon atoms per molecule and thereafter heating the condensation product at a temperature of from about 130° to about 180° C. for about 0.5 to about 10 hours.

3. A method of inhibiting corrosion of a metal surface upon contact with water which comprises effecting said contact in the presence of a corrosion inhibiting concentration of a corrosion inhibitor prepared by first condensing equimolar proportions of beta-propiolactone with tallow amine at a temperature of from about 10° C. to about 100° C. for about 0.5 to about 5 hours and thereafter heating the condensation product at a temperature of from about 130° to about 180° C. for about 0.5 to about 10 hours.

4. A method of inhibiting corrosion of a metal surface upon contact with water which comprises effecting said contact in the presence of a corrosion inhibiting concentration of a corrosion inhibitor prepared by first condensing equimolar proportions of beta-propiolactone with N-tallow-1,3-diaminopropane at a temperature of from about 10° C. to about 100° C. for about 0.5 to about 5 hours and thereafter heating the condensation product at a temperature of from about 130° to about 180° C. for about 0.5 to about 10 hours.

5. Hydrocarbon oil containing from about 0.0001% to about 10% by weight of an inhibitor prepared by first condensing equimolar proportions of a beta-lactone containing from about 3 to about 6 carbon atoms per molecule and a polyamine containing from about 8 to about 70 carbon atoms per molecule at a temperature of from about 10° C. to about 200° C. for about 0.5 to about 5 hours and thereafter maintaining the condensation product at a temperature of from about 100° to about 200° C. for about 0.5 to about 10 hours.

6. Hydrocarbon oil containing from about 0.0001% to about 10% by weight of an inhibitor prepared by first condensing equimolar proportions of beta-propiolactone with tallow amine at a temperature of from about 10° C. to about 100° C. for about 0.5 to about 5 hours and thereafter heating the condensation product at a temperature of from about 130° to about 180° C. for about 0.5 to about 10 hours.

7. Hydrocarbon oil containing from about 0.0001% to about 10% by weight of an inhibitor prepared by first condensing equimolar proportions of beta-propiolactone with N-tallow-1,3-diaminopropane at a temperature of from about 10° C. to about 100° C. for about 0.5 to about 5 hours and thereafter heating the condensation product at a temperature of from about 130° to about 180° C. for about 0.5 to about 10 hours.

8. A method of retarding corrosion of a metal surface in contact with a hydrocarbon oil containing a small amount of water, which comprises adding to said oil and effecting said contact in the presence of from about 0.0001% to about 10% by weight of a corrosion inhibitor prepared by first condensing equimolar proportions of a beta-lactone containing from about 3 to about 6 carbon atoms per molecule and a polyamine containing from about 8 to about 70 carbon atoms per molecule at a temperature of from about 10° C. to about 200° C. for about 0.5 to about 5 hours and thereafter maintaining the condensation product at a temperature of from about 100° to about 200° C. for about 0.5 to about 10 hours.

9. A method of retarding corrosion of a metal surface in contact with a hydrocarbon oil containing a small amount of water, which comprises adding to said oil and effecting said contact in the presence of from about 0.0001% to about 10% by weight of a corrosion inhibitor prepared by first condensing, at a temperature of from about 10° to about 100° C. and for a reaction period of from about 0.5 to about 5 hours, equimolar proportions of a beta-lactone containing from about 3 to about 6 carbon atoms per molecule and a polyamine containing from about 8 to about 70 carbon atoms per molecule and thereafter heating the condensation product at a temperature of from about 130° to about 180° C. for about 0.5 to about 10 hours.

10. The method of claim 9 further characterized in that said lactone is beta-propiolactone and said polyamine is tallow amine.

11. The method of claim 9 further characterized in that said lactone is beta-propiolactone and said polyamine is N-tallow-1,3-diaminopropane.

References Cited in the file of this patent

UNITED STATES PATENTS

| | | |
|---|---|---|
| 2,502,453 | Gresham et al. | Apr. 4, 1950 |
| 2,548,156 | Gresham et al. | Apr. 10, 1951 |
| 2,568,621 | Gresham et al. | Sept. 18, 1951 |
| 2,851,344 | Marsh et al. | Sept. 9, 1958 |
| 2,851,345 | Marsh et al. | Sept. 9, 1958 |